(12) United States Patent
Peng

(10) Patent No.: US 12,504,081 B2
(45) Date of Patent: Dec. 23, 2025

(54) HIGH-FLOW REVERSE WATER INLET CARTRIDGE SEAT

(71) Applicant: KUCHING INTERNATIONAL LTD., Taichung (TW)

(72) Inventor: Hao-Nan Peng, Taichung (TW)

(*) Notice: Subject to any disclaimer, the term of this patent is extended or adjusted under 35 U.S.C. 154(b) by 41 days.

(21) Appl. No.: 18/596,726

(22) Filed: Mar. 6, 2024

(65) Prior Publication Data

US 2025/0283542 A1  Sep. 11, 2025

(51) Int. Cl.
*F16K 11/078* (2006.01)

(52) U.S. Cl.
CPC .............................. *F16K 11/0787* (2013.01)

(58) Field of Classification Search
CPC .................................................. F16K 11/0787
See application file for complete search history.

(56) References Cited

U.S. PATENT DOCUMENTS

| | | | | |
|---|---|---|---|---|
| 4,610,268 A * | 9/1986 | Knapp | ................ | F16K 11/0787 137/454.6 |
| 4,804,011 A * | 2/1989 | Knapp | ................ | F16K 27/045 137/636.2 |
| 5,213,134 A * | 5/1993 | Orlandi | ............... | F16K 11/0787 137/625.4 |
| 5,320,129 A * | 6/1994 | Bosio | .................. | F16K 27/045 137/269 |
| 5,329,958 A * | 7/1994 | Bosio | ................. | F16K 11/0782 251/355 |
| 5,402,819 A * | 4/1995 | Bosio | .................. | F16K 11/0787 137/270 |
| 5,402,827 A * | 4/1995 | Gonzalez | ............ | F16K 11/0787 137/271 |
| 5,417,242 A * | 5/1995 | Goncze | ............... | F16K 11/0787 137/625.4 |
| 5,839,464 A * | 11/1998 | O'Hara | ................. | F16K 27/045 137/217 |
| 5,853,023 A * | 12/1998 | Orlandi | ............... | F16K 11/0787 137/271 |
| 5,857,489 A * | 1/1999 | Chang | ................. | F16K 11/0787 137/625.4 |
| 6,170,523 B1 * | 1/2001 | Chang | .................. | F16K 27/045 251/288 |
| 6,845,917 B1 * | 1/2005 | Chen | .................. | G05D 23/1313 251/304 |
| 7,063,105 B1 * | 6/2006 | Chen | .................. | F16K 11/0787 137/625.17 |

(Continued)

FOREIGN PATENT DOCUMENTS

| | | | | |
|---|---|---|---|---|
| DE | 3600959 A1 * | 3/1987 | .......... | F16K 11/0787 |
| DE | 3736794 A1 * | 3/1989 | .......... | F16K 11/0787 |

(Continued)

*Primary Examiner* — David Colon-Morales
(74) *Attorney, Agent, or Firm* — Egbert, McDaniel & Swartz, PLLC

(57) ABSTRACT

A reverse water inlet cartridge seat has a seat body with a substrate and a cylindrical wall formed around the substrate, a pair of inlet holes and an outlet hole extending through the substrate, a pair of inlet enclosing frames protruding through a top surface of the seat body, and a circular waterflow passage formed between the pair of inlet enclosing frames and the cylindrical wall of the seat body so as to form a circumferential passage. The cylindrical wall protrudes from the top surface of the substrate.

8 Claims, 6 Drawing Sheets

(56) References Cited

U.S. PATENT DOCUMENTS

| | | | | |
|---|---|---|---|---|
| 7,108,012 | B2 * | 9/2006 | Rosko | F16K 11/0787 251/297 |
| 7,134,452 | B2 * | 11/2006 | Hiroshi | F16K 11/0787 251/117 |
| 7,357,154 | B1 * | 4/2008 | Chen | F16K 11/0787 251/297 |
| 8,079,384 | B2 * | 12/2011 | Chen | F16K 3/0236 251/363 |
| 8,578,966 | B2 * | 11/2013 | Thomas | F16K 11/0787 251/284 |
| 8,646,750 | B1 * | 2/2014 | Chen | F16K 11/0782 137/625.15 |
| 8,695,635 | B1 * | 4/2014 | Wang | F16K 11/0787 137/625.42 |
| 8,863,778 | B2 * | 10/2014 | Chen | F16K 11/02 251/297 |
| 8,875,737 | B2 * | 11/2014 | Cattaneo | F16K 11/0787 137/625.4 |
| 8,978,700 | B2 * | 3/2015 | Frackowiak | F16K 11/0787 137/625.4 |
| 9,091,357 | B2 * | 7/2015 | Chen | F16K 11/0785 |
| 9,115,818 | B2 * | 8/2015 | Lange | F16K 11/0787 |
| 9,464,417 | B2 * | 10/2016 | Chen | E03C 1/041 |
| 10,167,963 | B1 * | 1/2019 | Chang | F16K 11/072 |
| 10,167,964 | B1 * | 1/2019 | Chang | F16K 31/002 |
| 10,533,681 | B2 * | 1/2020 | Chen | F16K 19/006 |
| 10,571,034 | B2 * | 2/2020 | Kim | F16K 11/202 |
| 10,648,576 | B1 * | 5/2020 | Chang | F16K 11/0787 |
| 10,935,157 | B2 * | 3/2021 | Du | F16K 31/602 |
| 11,028,930 | B2 * | 6/2021 | Cattaneo | F16K 11/0787 |
| 11,092,250 | B2 * | 8/2021 | Allen | F16K 27/045 |
| 11,174,626 | B2 * | 11/2021 | Kobayashi | F16K 11/078 |
| 11,549,601 | B2 * | 1/2023 | Asanoma | F16N 1/00 |
| 11,686,398 | B1 * | 6/2023 | Huang | E03C 1/0412 137/605 |
| 11,781,661 | B1 * | 10/2023 | Zhang | F16K 11/056 137/625 |
| 12,098,773 | B2 * | 9/2024 | Ma | F16K 27/044 |
| 12,110,971 | B2 * | 10/2024 | Tueshaus | F16K 47/04 |
| 2005/0229983 | A1 * | 10/2005 | Chen | F16K 11/0787 137/625.17 |
| 2006/0219304 | A1 * | 10/2006 | Di Nunzio | F16K 11/0787 137/625.4 |

FOREIGN PATENT DOCUMENTS

| | | | | |
|---|---|---|---|---|
| DE | 102014000840 | B3 * | 3/2015 | F16K 47/04 |
| DE | 102022123992 | A1 * | 3/2024 | E03C 1/0403 |
| IT | MI20110504 | A1 * | 9/2012 | F16K 27/045 |
| IT | MI20110527 | A1 * | 10/2012 | F16K 11/0787 |
| WO | WO-0005524 | A1 * | 2/2000 | F16K 27/045 |

* cited by examiner

HIGH-FLOW REVERSE WATER INLET CARTRIDGE SEAT

CROSS-REFERENCE TO RELATED APPLICATIONS

Not applicable.

BACKGROUND OF THE INVENTION

The present invention relates to a cartridge, in particular to an innovative high-flow reverse water inlet cartridge seat structure.

A reverse water inlet cartridge refers to a configuration in which the inlet and outlet holes of a fixed valve disk of the cartridge have a reverse relationship to the direction of flow of water into and out of the faucet.

The reverse water inlet cartridge achieves flow path redirection by coordinating the specific valve base with the fixed valve disk of a standard type to allow water to flow through the middle part between the two inlet ports after exiting the lower ceramic disk, thereby reversing the flow direction. However, limitations on the position of the cartridge base inlet port or factors such as compatibility with conventional lower ceramic disk hole positions often result in common problems of compression and reduction in flow during this process.

SUMMARY OF THE INVENTION

The main purpose of the present invention is to provide a high-flow reverse water inlet cartridge seat, aiming to innovatively address the technical problem of developing a more practical and ideal new type of water inlet cartridge seat structure.

To achieve this purpose, the present invention provides the high-flow reverse water inlet cartridge seat, comprising: a seat body including a substrate and a cylindrical wall formed around the substrate, wherein the substrate features a top surface and a bottom surface, and the cylindrical wall protrudes from the top surface; two inlet holes and one outlet hole are triangularly configured and pierced through the top surface and the bottom surface of the substrate; two inlet enclosing frames are protruded from the top surface of the seat body; and a circular waterflow passage is formed between the two inlet enclosing frames and the cylindrical wall of the seat body to form a circumferential passage with a central passage, and the circular waterflow passage features an inlet side and an outlet side, with the outlet side communicating with the outlet hole.

With this innovative structure and technical features, the present invention, as compared to the prior art, effectively increases the cross-sectional area of the flow path of the reverse water inlet cartridge through the characteristic features of the circular waterflow passage, thereby achieving improved flow rates, practical advancements, and enhanced industrial utility benefits to meet various user requirements.

DETAILED DESCRIPTION OF THE INVENTION

Figure 1:
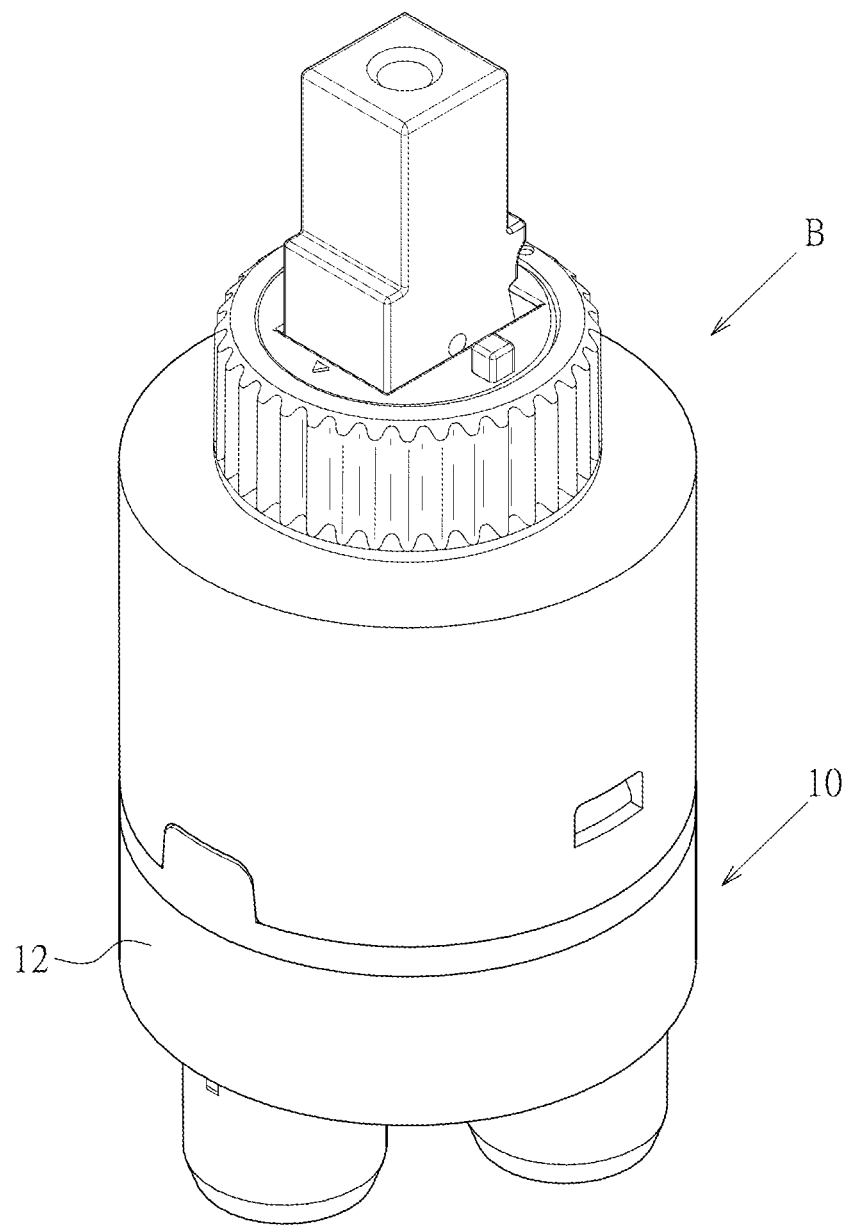
FIG. 1 is an assembled three-dimensional view of a preferred embodiment of the present invention.
Figure 2:
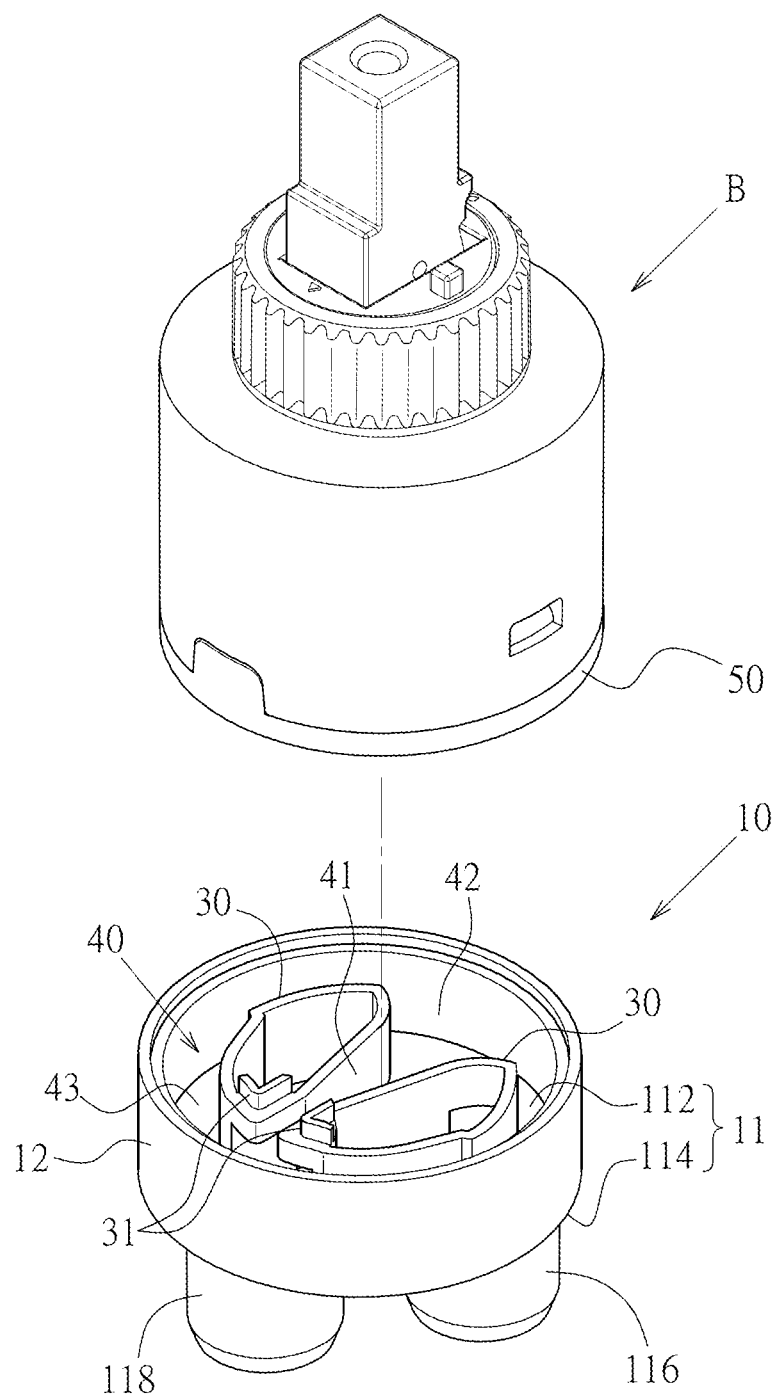
FIG. 2 is an exploded three-dimensional view of a preferred embodiment of the present invention.

Reference is made to FIGS. 1 through 6, which depict a preferred embodiment of a high-flow reverse water inlet cartridge seat provided by the present invention. However, this embodiment is for illustrative purposes only and is not limited to the structure described herein.

The high-flow reverse water inlet cartridge seat comprises the following components: a seat body 10, including a substrate 11 and a cylindrical wall 12 formed around the substrate 11, wherein the substrate 11 features a top surface 112 and a bottom surface 114, and the cylindrical wall 12 protrudes from the top surface 112. Two inlet holes 21 and one outlet hole 22 are triangularly configured and pierced through the top surface 112 and the bottom surface 114 of the substrate 11. Two inlet enclosing frames 30 are protruded from the top surface 112 of the seat body 10. A circular waterflow passage 40 is formed between the two inlet enclosing frames 30 and the cylindrical wall 12 of the seat body 10 to form a circumferential passage with a central passage 41. The circular waterflow passage 40 features an inlet side 42 and an outlet side 43, with the outlet side 43 communicating with the outlet hole 22. Additionally, the two inlet enclosing frames 30 extend toward the outlet hole 22 to form extended passages 32 relatively away from the two inlet holes 21 (shown in FIG. 4 only).

Figure 3:
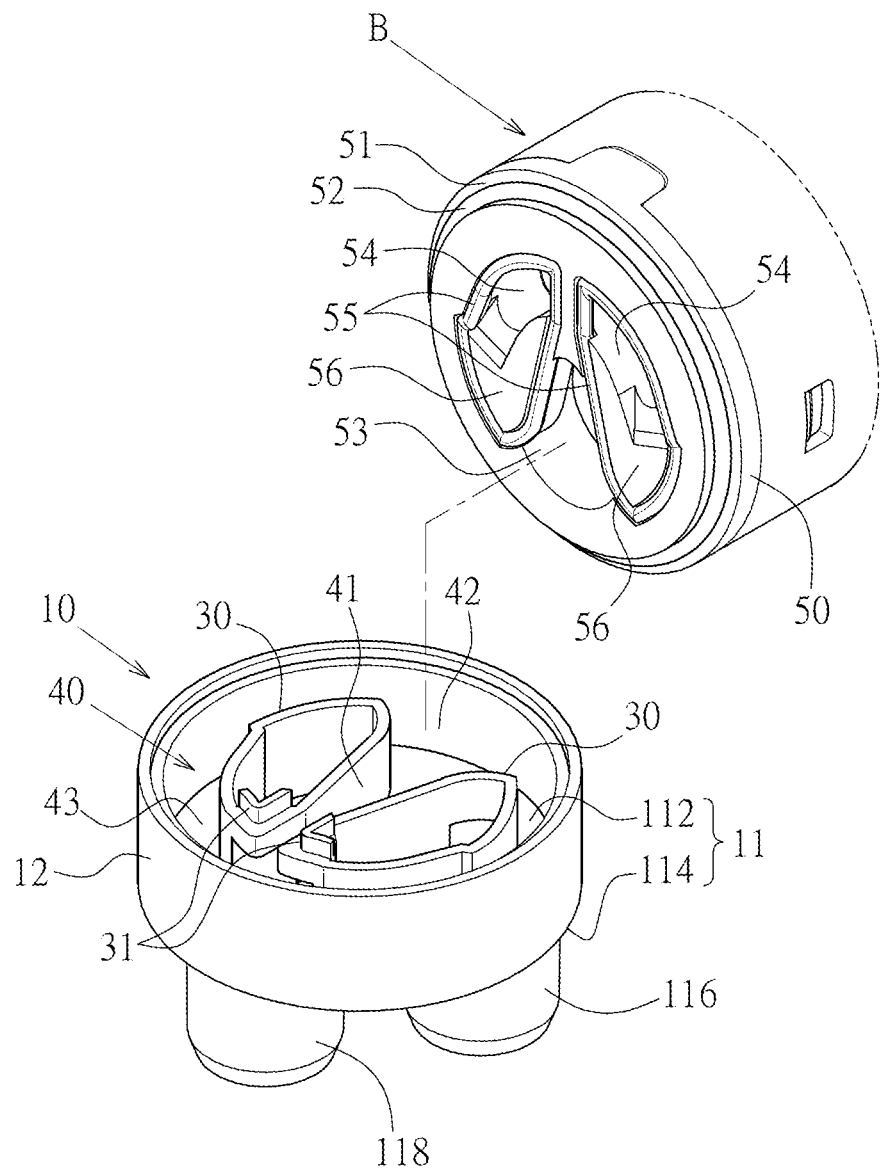
FIG. 3 is an exploded three-dimensional view of a preferred embodiment of the present invention in another perspective of the cartridge.

As shown in FIG. 3, in this embodiment, the high-flow reverse water inlet cartridge seat is used to be mounted on the bottom of a cartridge B, and the bottom of the cartridge B includes a base 50. Moreover, the periphery of the base 50 forms a groove 51, and a leak prevention ring 52 is embedded in the groove 51. The groove 51 is precisely designed to allow the cylindrical wall 12 of the seat body 10 to be nested and connected. As shown in FIG. 3, the base 50 also includes an outlet port 53, two inlet ports 54, and two inlet leak prevention rings 55 that separate the flow paths of the two inlet ports 54 and the outlet port 53. The two inlet leak prevention rings 55 match the contour position of the two inlet enclosing frames 30 and tightly abut against each other. The outlet port 53 is positioned opposite the inlet side 42 of the circular waterflow passage 40.

Within the area of each inlet leak prevention ring 55, a baffle 56 is further formed near the outlet port 53.

Figure 5:
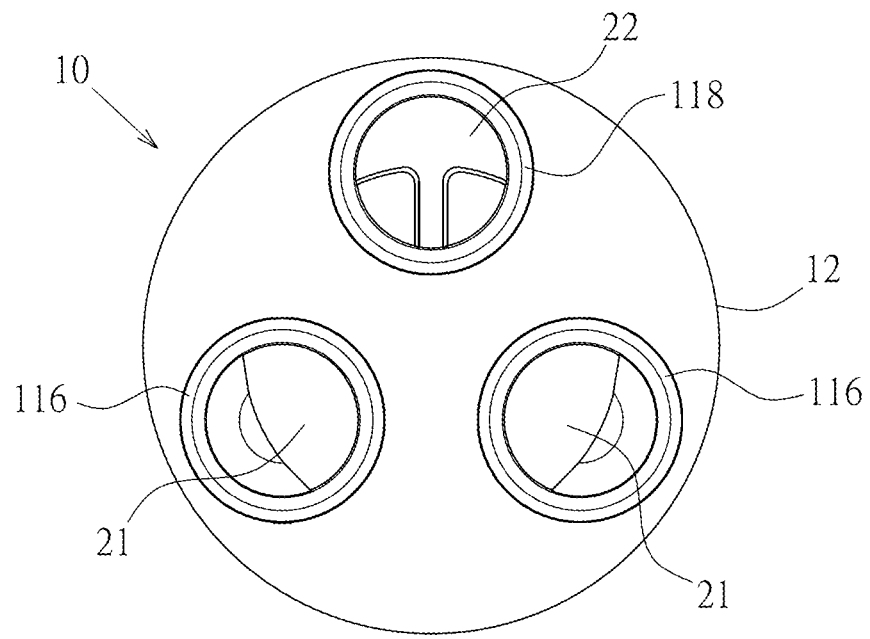
FIG. 5 is a bottom view of the base of a preferred embodiment of the present invention.
Figure 6:
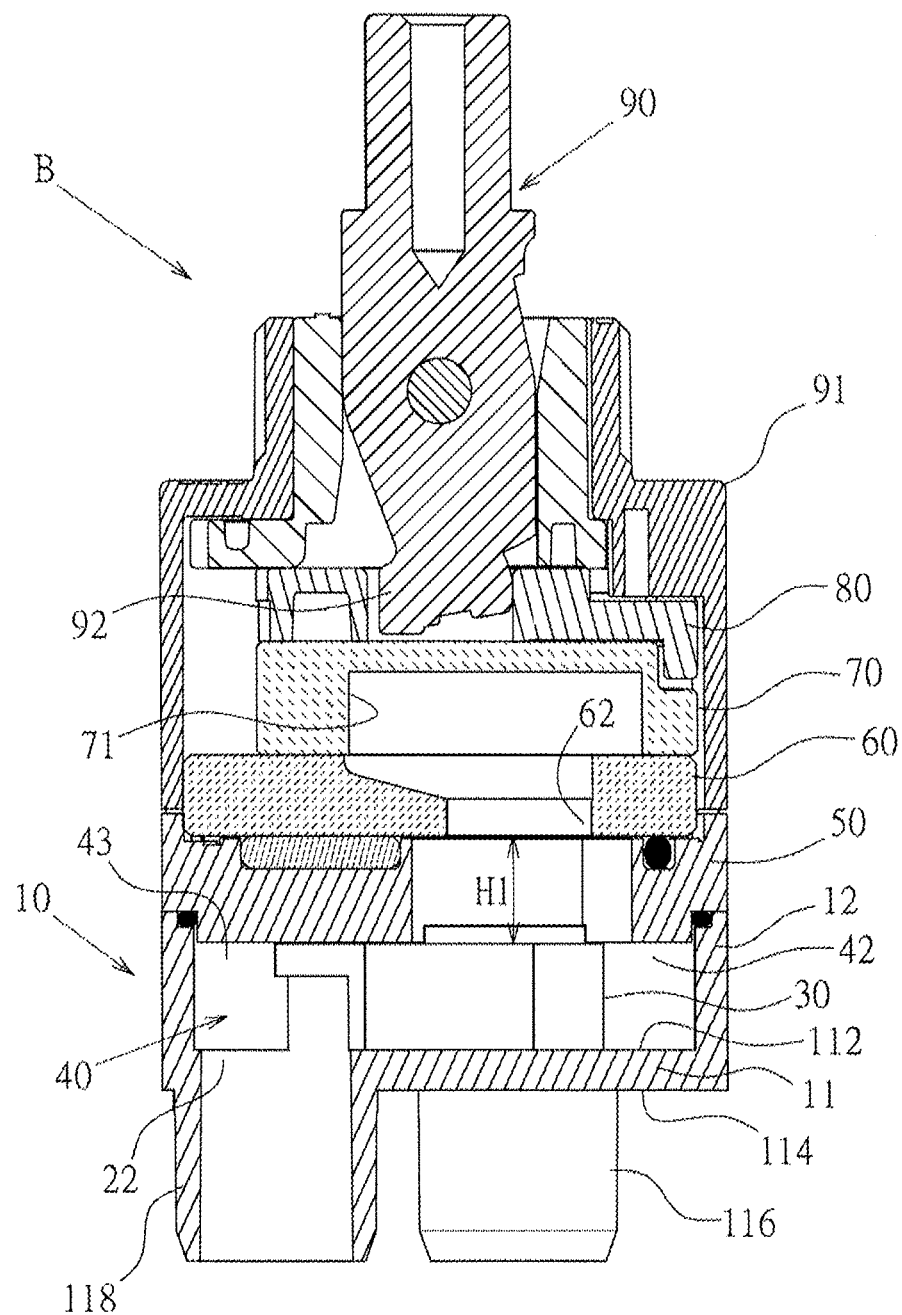
FIG. 6 is a vertical sectional view of a preferred embodiment of the present invention.

As shown in FIGS. 5 and 6, a fixed ceramic disk 60, a movable ceramic disk 70, a driving seat 80, an actuating stem 90, and a valve casing 91 are sequentially assembled above the base 50. The fixed ceramic disk 60 includes two inlet holes 61 and an outlet hole 62, the two inlet holes 61 corresponding to and communicating with the two inlet ports 54 of the base 50, and the outlet hole 62 corresponding to and communicating with the outlet port 53 of the base 50. The movable ceramic disk 70 is stacked above the fixed ceramic disk 60, and the bottom of the movable ceramic disk 70 forms a converging passage 71 to control the communication state between the two inlet holes 61 and the outlet hole 62 of the fixed ceramic disk 60. The actuating stem 90 is pivotally mounted in the valve casing 91 to allow a pivotal movement, and the bottom of the actuating stem 90 is provided with a connecting part 92 for driving the driving seat 80, and the driving seat 80 is nested above the movable ceramic disk 70.

As shown in FIG. 6, a vertical flow passage distance H1 is formed between the inlet side 42 of the circular waterflow passage 40 and the outlet hole 62 of the fixed ceramic disk 60 by the thickness of the base 50. The advantage of this embodiment is that it can further increase the cross-sectional area of the outlet flow path so as to increase a flow rate of the water.

Figure 7:
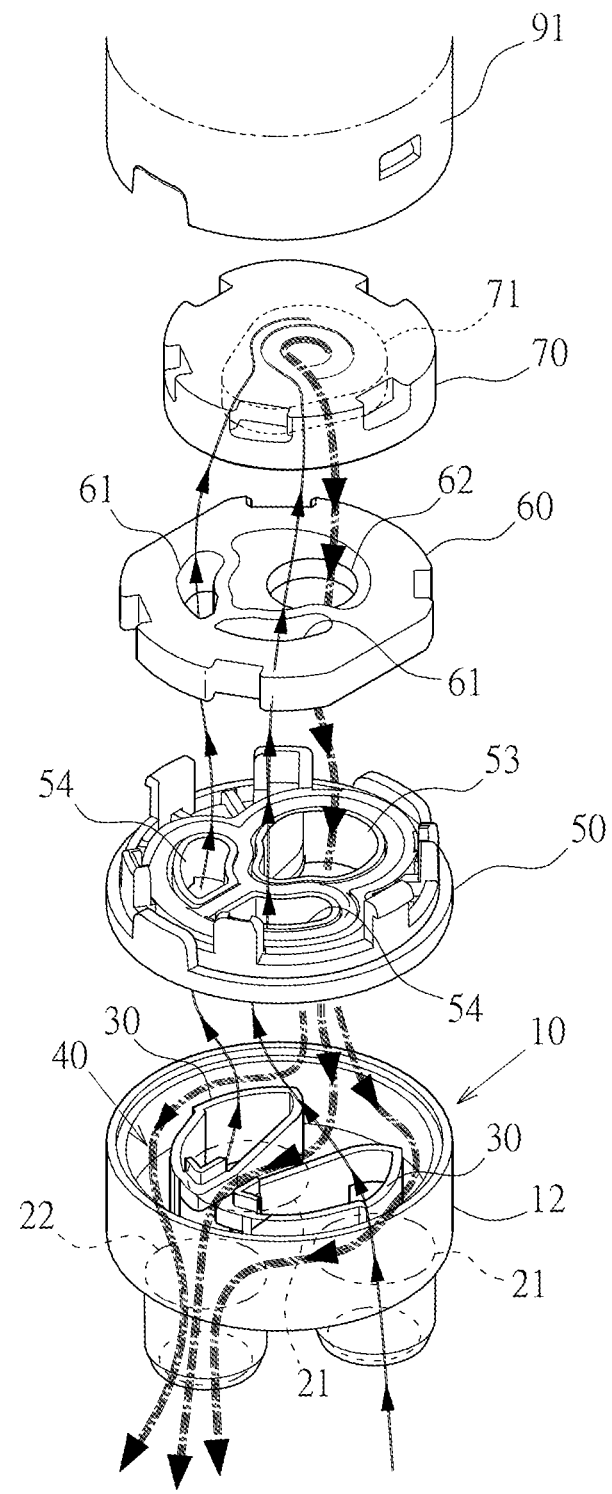
FIG. 7 is a schematic diagram of the flow path of a preferred embodiment of the present invention.

With the above structural configuration and technical features, when the high-flow reverse water inlet cartridge seat disclosed by the present invention is mounted on the bottom of the cartridge B in a practical application, the flow paths are as shown in FIG. 7. The cold and hot water first enter through the two inlet holes 21 of the seat body 10, then flow sequentially through the two inlet ports 54 of the base 50, the two inlet holes 61 of the fixed ceramic disk 60, and then turn downward after adjusting the cold and hot water mixing ratio through the converging passage 71 at the bottom of the movable ceramic disk 70. Thereafter, the water flows through the outlet hole 62 of the fixed ceramic disk 60, the outlet port 53 of the base 50, and finally through the circular waterflow passage 40 of the seat body 10, which exits from the outlet hole 22. Wherein, the circular waterflow passage 40, which is formed between the two inlet enclosing frames 30 and the cylindrical wall 12 in a circumferential passage shape, is not restricted by the narrow distance between the two inlet ports of the conventional cartridge, thereby effectively increasing the cross-sectional area of the outlet flow path, significantly improving the flow rate, and satisfying various user requirements.

It is worth mentioning that another advantage of the high-flow reverse water inlet cartridge seat disclosed by the present invention in application is that it allows for conversion and adaptation between the inlet and outlet hole positions of a general cartridge and those of a new-style faucet, because the inlet and outlet hole positions of the new-style faucet are configured opposite to those of the old-style faucet.

Figure 4:
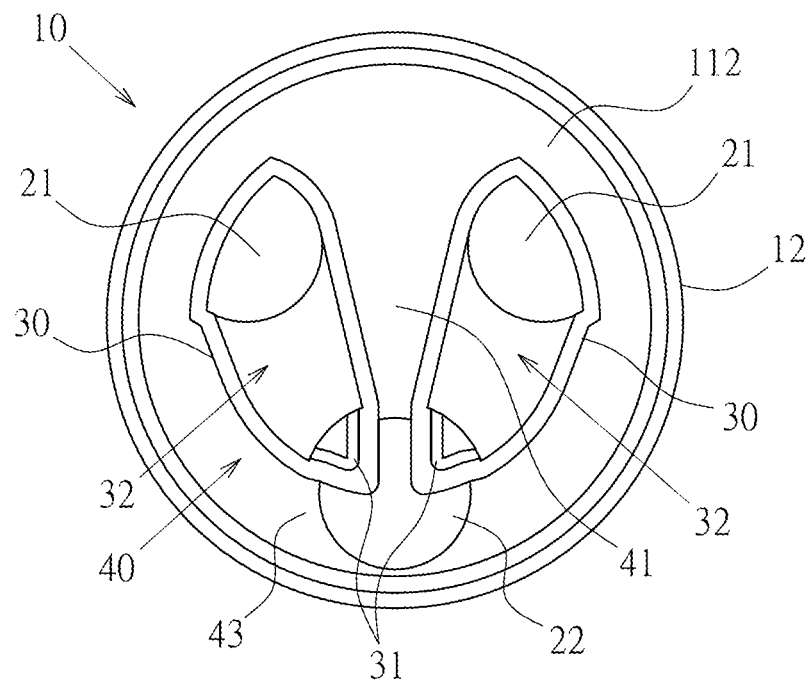
FIG. 4 is a top view of the base of a preferred embodiment of the present invention.

As shown in FIGS. 3 and 4, one end of each inlet enclosing frame 30 is further provided with a protruding edge 31 that fits into the corresponding position of the inlet leak prevention ring 55 to form a position limiting effect.

As shown in FIGS. 3 and 5, the bottom surface 114 of the substrate 11 forms two inlet conduits 116 communicating with the two inlet holes 21 and an outlet conduit 118 communicating with the outlet hole 22.

Moreover, the baffle 56 corresponds to the inlet hole 21, and the extended passage 32 corresponds to the inlet port 54.

The invention claimed is:

1. A reverse water inlet cartridge seat comprising:
a seat body having a substrate and a cylindrical wall formed around the substrate, wherein the substrate has a top surface and a bottom surface, the cylindrical wall protruding from the top surface;
a pair of inlet holes and an outlet hole configured triangularly and extending through the top surface and the bottom surface of the substrate;
a pair of inlet enclosing frames protruding from the top surface of said seat body; and
a circular waterflow passage formed between said pair of inlet enclosing frames and the cylindrical wall of said seat body so as to form a circumferential passage, wherein said circular waterflow passage has an inlet side and an outlet side, the outlet side communicating with the outlet hole.

2. The reverse water inlet cartridge seat of claim 1, wherein the reverse water inlet cartridge seat is mountable on a bottom of a cartridge, the bottom of the cartridge having a base with an outlet port and a pair of inlet ports and a pair of inlet leak prevention rings, the pair of inlet leak prevention rings adapted to separate flow paths of the pair of inlet ports and the outlet port, wherein the pair of inlet leak prevention rings match a contour position of the pair of inlet enclosing frames so as to tightly abut each other, the outlet port being positioned in the inlet side of the circular waterflow passage.

3. The reverse water inlet cartridge seat of claim 2, wherein a baffle is formed adjacent the outlet port within an area of each of the pair of inlet leak prevention rings.

4. The reverse water inlet cartridge seat of claim 3, wherein said pair of inlet enclosing frames extend toward the outlet hole so as to form extended passages away from the pair of inlet holes.

5. The reverse water inlet cartridge seat of claim 4, wherein the baffle corresponds with the inlet hole and the extended passage corresponds to the inlet port.

6. The reverse water inlet cartridge seat of claim 2, wherein a fixed ceramic disk and a movable ceramic disk and a driving seat and an actuating stem and a valve casing are sequentially assembled above the base of the cartridge, wherein the ceramic disk has a pair of inlet holes and an outlet hole, the pair of inlet holes of the fixed ceramic disk corresponding to and communicating with the pair of inlet ports of the base, the outlet hole of the fixed ceramic disk corresponding to and communicating with the outlet port of the base, wherein the movable ceramic disk is stacked above the fixed ceramic disk, a bottom of the movable ceramic disk defining a converging passage that controls communication between the pair of inlet holes and the outlet hole of the fixed ceramic disk, wherein the actuating stem is pivotally mounted in the valve casing, a bottom of the actuating stem having a connecting part drivingly connected to the driving seat, wherein the driving seat is nested above the movable ceramic disk.

7. The reverse water inlet cartridge seat of claim 6, wherein a vertical flow passage distance is formed between the inlet side of said circular waterflow passage and the outlet hole of the fixed ceramic disk defined by a thickness of the base.

8. The reverse water inlet cartridge seat of claim 2, wherein one end of each of said pair of inlet enclosing frames has a protruding edge that fits into a corresponding position of the inlet leak prevention ring.

* * * * *